United States Patent
Han et al.

(10) Patent No.: US 9,078,264 B2
(45) Date of Patent: Jul. 7, 2015

(54) METHOD FOR REPORTING POWER HEADROOM REPORT AND USER EQUIPMENT

(71) Applicant: Huawei Technologies Co., Ltd., Shenzhen (CN)

(72) Inventors: Guanglin Han, Beijing (CN); Anjian Li, Beijing (CN); Wurong Zhang, Beijing (CN); Wei Quan, Beijing (CN); Yi Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/723,830

(22) Filed: Dec. 21, 2012

(65) Prior Publication Data

US 2013/0114457 A1  May 9, 2013

Related U.S. Application Data

(63) Continuation of application No. PCT/CN2011/074626, filed on May 25, 2011.

(30) Foreign Application Priority Data

Jun. 22, 2010 (CN) .......................... 2010 1 0210820

(51) Int. Cl.
*H04W 72/04* (2009.01)
*H04W 52/36* (2009.01)

(52) U.S. Cl.
CPC ........ *H04W 72/0473* (2013.01); *H04W 52/365* (2013.01)

(58) Field of Classification Search
None
See application file for complete search history.

(56) References Cited

U.S. PATENT DOCUMENTS

| | | | |
|---|---|---|---|
| 2007/0115871 A1 | 5/2007 | Zhang et al. | |
| 2009/0303954 A1 | 12/2009 | Guo | |
| 2009/0318180 A1 | 12/2009 | Yi et al. | |

(Continued)

FOREIGN PATENT DOCUMENTS

| | | |
|---|---|---|
| CN | 101715207 A | 5/2010 |
| CN | 101729108 A | 6/2010 |

(Continued)

OTHER PUBLICATIONS

Ericsson, et al., "Uplink Power Control for Carrier Aggregation," 3GPP TSG RAN WG1 Meeting #59bis, R1-10045, Valencia, Spain, Jan. 18-22, 2009, 4 pages.

(Continued)

*Primary Examiner* — Ashley Shivers
(74) *Attorney, Agent, or Firm* — Slater & Matsil, L.L.P.

(57) ABSTRACT

The present invention discloses a method for reporting a power headroom report and a user equipment, which are applied in the field of communications. The method includes triggering reporting of a first power headroom report and determining that a condition of sending the first power headroom report is satisfied. The condition of sending the first power headroom report includes a determination that uplink data channel transmission occurs in a current transmission time interval. The first power headroom report is obtained. The first power headroom report includes a first power headroom value that includes a difference between maximum transmitting power of a carrier and a sum of transmitting power of a control channel of the carrier and transmitting power of a data channel of the carrier.

20 Claims, 5 Drawing Sheets

(56) References Cited

U.S. PATENT DOCUMENTS

| | | | | |
|---|---|---|---|---|
| 2010/0296470 | A1* | 11/2010 | Heo et al. ................... | 370/329 |
| 2011/0105173 | A1* | 5/2011 | Haim et al. .................. | 455/522 |
| 2011/0243016 | A1* | 10/2011 | Zhang et al. ................. | 370/252 |
| 2012/0146323 | A1 | 6/2012 | Schilling et al. | |
| 2012/0224535 | A1* | 9/2012 | Kim et al. ................... | 370/328 |

FOREIGN PATENT DOCUMENTS

| | | |
|---|---|---|
| CN | 101808360 A | 8/2010 |
| JP | 2008537448 A | 9/2008 |
| JP | 2009303213 A | 12/2009 |
| JP | 20120532351 A | 12/2012 |
| JP | 2013507069 A | 2/2013 |
| WO | WO 2010/065759 A2 | 6/2010 |
| WO | WO 2011/041666 A2 | 4/2011 |

OTHER PUBLICATIONS

Nokia Siemens Networks, "Summary of offline discussion on UL PC," 3GPP TSG RAN WG1 #59BIS Meeting, R1-100815, Valencia, Spain, Jan. 18-22, 2010, 7 pages.

Ran1, "LS on power headroom reporting for carrier aggregation," 3GPP TSG RAN WG1 Meeting #61, R1-103405, Montreal, Canada, May 10-14, 2010, 1 page.

Research in Motion UK Limited, "Uplink Power Control for Carrier Aggregation," 3GPP TSG RAN WG1 Meeting #58, R1-093297, Shenzhen, China, Aug. 24-28, 2009, 3 pages.

International Search Report received in International Application No. PCT/CN2011/074626, Applicant: Huawei Technologies Co., Ltd., et al., mailed Sep. 8, 2011, 3 pages.

Written Opinion of the International Searching Authority received in International Application No. PCT/CN2011/074626, Applicant: Huawei Technologies Co., Ltd. et al., mailed Sep. 8, 2011, 8 pages.

Notice of Reasons for Rejection received in Japanese Application No. 2013-515678 mailed Jan. 28, 2014, 7 pages.

First Office Action of Chinese Application No. 201010210820.5 mailed May 16, 2013, 36 pages. (Partial Translation).

Extended European Search Report received in Application No. 11797559.9-1855, Applicant: Huawei Technologies Co., Ltd., mailed Apr. 8, 2013, 10 pages.

Catt, "Considerations on uplink power control in LTE-Advanced," 3GPP TSG RAN WG1 meeting #59bis, R1-100071, Valencia, Spain, Jan. 18-22, 2010, 3 pages.

LG Electronics, "Remaining issues about power headroom reporting for LTE-A," 3GPP TSG RAN WG1 #61, R1-102693, Montreal, Canada, May 10-14, 2010, 5 pages.

Nokia Siemens Networks, "Uplink Power Control for LTE-Advanced," 3GPP TSG RAN WG1 #59bis Meeting, R1-100322, Valencia, Spain, Jan. 18-22, 2010, 8 pages.

Research in Motion, et al., "PH reporting for Carrier Aggregation," 3GPP TSG RAN WG1 Meeting#61, R1-103066, Montreal, Canada, May 10-14, 2010, 2 pages.

LG Electronics, "Uplink Transmission Under UE Transmit Power Limitation in LTE-Advanced," 3GPP TSG RAN WG1 #58, R1-093250, Shenzhen, China, Aug. 24-28, 2009, 3 pages.

\* cited by examiner

METHOD FOR REPORTING POWER HEADROOM REPORT AND USER EQUIPMENT

This application is a continuation of International Application No. PCT/CN2011/074626, filed on May 25, 2011, which claims priority to Chinese Patent Application No. 201010210820.5, filed on Jun. 22, 2010, both of which are hereby incorporated by reference in their entireties.

TECHNICAL FIELD

The present invention relates to communications technologies, and in particular, to a power control technology.

BACKGROUND

An LTE-Advance (Long Term Evolved-Advance) network is a communication network on which manufacturers are researching actively, and is an advancement of an LTE network, the objective of which is to provide a low-cost network capable of reducing time delay, increasing a user data rate, and improving system capacity and coverage.

For example, in an LTE technology, data on a data channel and data on a control channel cannot be sent in the same subframe. For example, data on a PUSCH (Physical Uplink Shared Channel, physical uplink shared channel) and data on a PUCCH (Physical Uplink Control Channel, physical uplink control channel) cannot be sent in the same subframe. A user equipment reports a power headroom report of the PUSCH to a base station. When the base station receives the power headroom report sent by the user equipment in a subframe, the base station may obtain, according to a power headroom value included in the power headroom report, a power headroom of the user equipment when the user equipment sends data on the PUSCH. During subsequent radio resource scheduling, the base station needs the power headroom value for reference, to avoid that excessive resources are scheduled for a terminal and further prevent the user equipment from entering a power limited state when the user equipment sends data on the PUSCH.

With the support of an LTE-A technology, data on the PUCCH and data on the PUSCH may be sent in the same subframe. When the user equipment uses such a sending manner, if the base station refers to the power headroom value in the power headroom report in the prior art for radio resource scheduling, the user equipment may enter the power limited state.

SUMMARY OF THE INVENTION

Embodiments of the present invention provide a method for reporting a power headroom report, a method for triggering reporting of a power headroom report and a user equipment, enabling a base station to obtain a power headroom report of the user equipment, and perform radio resource scheduling correctly according to the power headroom, thereby solving the problem in the prior art that the base station has no correct power headroom for reference during resource scheduling.

An embodiment of the present invention provides a method for reporting a power headroom report, where the method includes triggering reporting of a first power headroom report, and determining that a condition of sending the first power headroom report is satisfied, where the condition of sending the first power headroom report includes: determining that uplink data channel transmission occurs in a current transmission time interval, obtaining the first power headroom report, where the first power headroom report includes a first power headroom value, and the first power headroom value includes a difference between maximum transmitting power of a carrier and a sum of transmitting power of a control channel of the carrier and transmitting power of a data channel of the carrier, and sending the first power headroom report.

An embodiment of the present invention provides a method for triggering reporting of a power headroom report, where the method includes determining that a first condition is satisfied, and triggering reporting of a first power headroom report, where the first power headroom report includes a difference between maximum transmitting power of a carrier and a sum of transmitting power of a control channel of the carrier and transmitting power of a data channel of the carrier, where the first condition includes at least one of the following conditions. A power headroom report of the data channel of the carrier is triggered, radio resource control RRC signaling sent by a base station is received, default configuration of a user equipment is reporting the first power headroom report. a configured periodic timer used to trigger reporting of the first power headroom report expires, a configured report prohibit timer expires and a measured path loss change of the carrier exceeds a configured first threshold, where the report prohibit timer is used to prohibit reporting of the first power headroom report during a timing period of the report prohibit timer, the data amount of at least one of a CQI, ACK, and NACK that are currently sent on the control channel exceeds a configured second threshold, it is determined that a format for sending the first power headroom report is a set format, the number of one of ACKs, NACKs, and periodic CQIs that are currently sent on the control channel exceeds a configured third threshold, and one of the number of carriers corresponding to an ACK currently sent on the control channel, the number of carriers corresponding to a NACK currently sent on the control channel, and the number of carriers corresponding to a periodic CQI currently sent on the control channel exceeds a configured fourth threshold.

An embodiment of the present invention provides a user equipment, including a triggering and determining module, configured to trigger reporting of a first power headroom report, and determine that a condition of sending the first power headroom report is satisfied, where the condition of sending the first power headroom report includes: determining that uplink data channel transmission occurs in a current transmission time interval, an obtaining module, configured to obtain the first power headroom report when the triggering and determining module triggers reporting of the first power headroom report and determines that the condition of sending the first power headroom report is satisfied, where the first power headroom report includes a first power headroom value, and the first power headroom value includes a difference between maximum transmitting power of a carrier and a sum of transmitting power of a control channel of the carrier and transmitting power of a data channel of the carrier, and a sending module, configured to send the first power headroom report obtained by the obtaining module.

An embodiment of the present invention further provides another user equipment, including a third determining module, configured to determine that a first condition is satisfied, and a triggering module, configured to trigger reporting of a first power headroom report when the third determining module determines that the first condition is satisfied, where the first power headroom report includes a difference between maximum transmitting power of a carrier and a sum of transmitting power of a control channel of the carrier and transmitting power of a data channel of the carrier, where the first condition includes at least one of the following conditions. A power headroom report of the data channel of the carrier is triggered, radio resource control RRC signaling sent by a base station is received, default configuration of the user equipment is reporting the first power headroom report, a configured periodic timer used to trigger reporting of the first power headroom report expires, a configured report prohibit timer expires and a measured path loss change of the carrier exceeds a configured first threshold, where the report prohibit timer is used to prohibit reporting of the first power headroom report during a timing period of the report prohibit timer, the data amount of at least one of a CQI, ACK, and NACK that are currently sent on the control channel exceeds a configured second threshold, it is determined that a format for sending the first power headroom report is a set format, the number of one of ACKs, NACKs, and periodic CQIs that are currently sent on the control channel exceeds a configured third threshold, and one of the number of carriers corresponding to an ACK currently sent on the control channel, the number of carriers corresponding to a NACK currently sent on the control channel, and the number of carriers corresponding to a periodic CQI currently sent on the control channel exceeds a configured fourth threshold.

Through a method for reporting a power headroom report according to the embodiment of the present invention, when data on the PUCCH and data on a PUSCH are sent in the same subframe at the same time, a base station can obtain a power headroom report considering transmitting power of a user equipment on a PUCCH, and the base station can obtain the power headroom report of the user equipment and perform resource scheduling correctly with reference to the power headroom report.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

To make the objectives, technical solutions, and advantages of the present invention clearer, the embodiments of the present invention are described in detail below with reference to the accompanying drawings.

A method for a user equipment to report a power headroom report is described in detail below.

It should be noted that, the following embodiment where a PUCCH of a carrier is used as a control channel of the carrier and a PUSCH of the carrier is used as a data channel of the carrier is not intended to limit the present invention.

Figure 1:
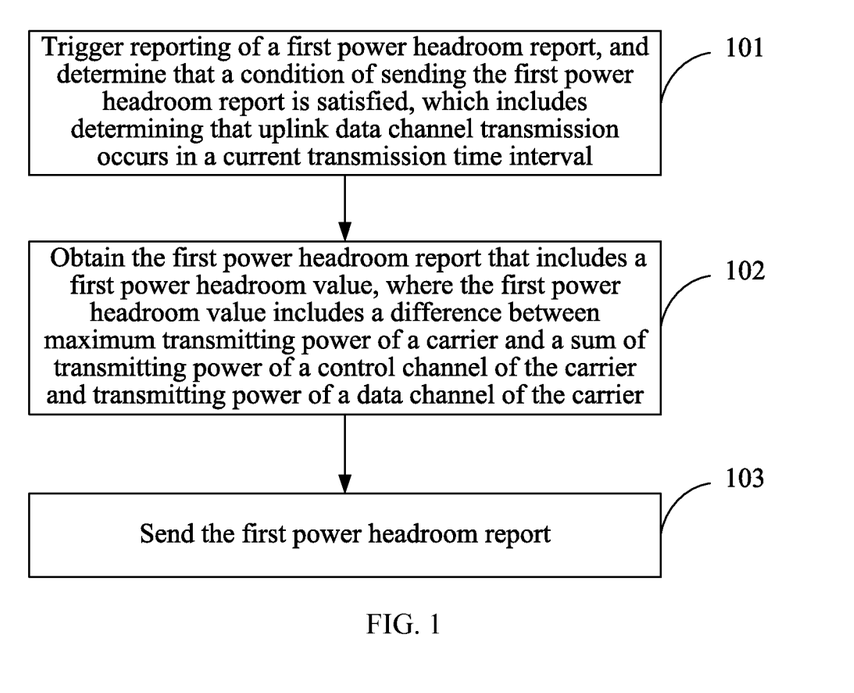
FIG. 1 is a flow chart of a method for reporting a power headroom report according to an embodiment of the present invention.

A method for reporting a power headroom report according to an embodiment of the present invention is described in detail below with reference to FIG. 1. As shown in FIG. 1, the method includes the following steps.

Step 101: Trigger reporting of a first power headroom report, and determine that a condition of sending the first power headroom report is satisfied, where the condition of sending the first power headroom report includes: determining that uplink data channel transmission occurs in a current transmission time interval.

Step 102: Obtain the first power headroom report, where the first power headroom report includes a first power headroom value, and the first power headroom value includes a difference between maximum transmitting power of a carrier and a sum of transmitting power of a control channel of the carrier and transmitting power of a data channel of the carrier.

Step 103: Send the first power headroom report.

Through a method for reporting a power headroom report according to the embodiment of the present invention, when data on the PUCCH and data on a PUSCH are sent in the same subframe at the same time, a base station can obtain a power headroom report considering transmitting power of a user equipment on a PUCCH, and the base station can obtain the power headroom report of the user equipment and perform resource scheduling correctly with reference to the power headroom report.

Figure 2:
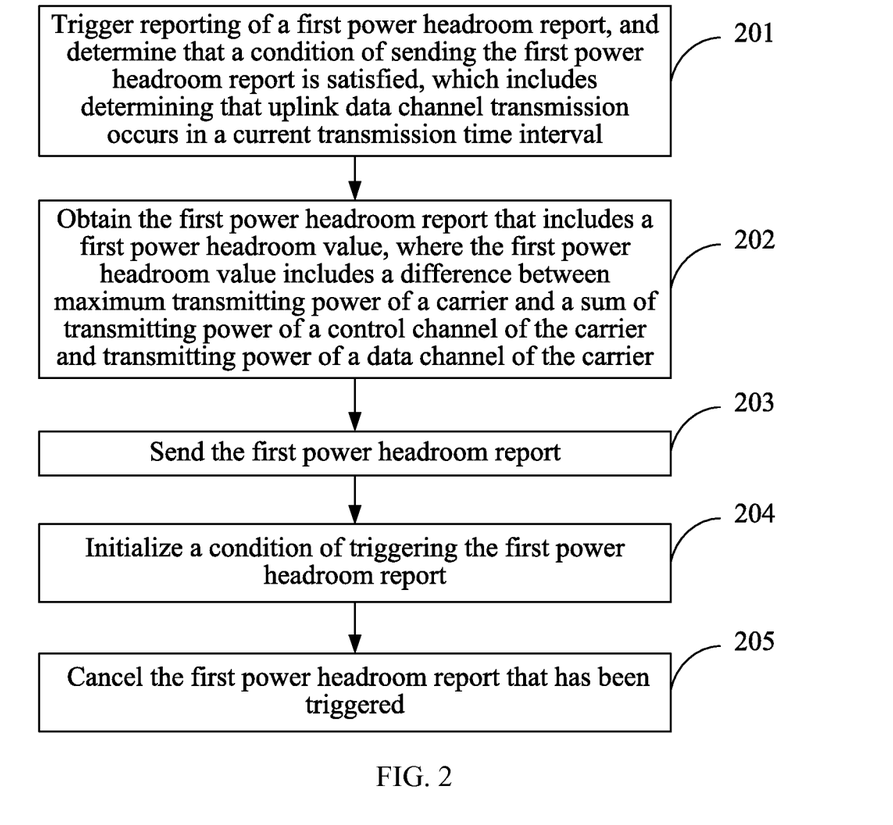
FIG. 2 is a flow chart of another method for reporting a power headroom report according to an embodiment of the present invention.

A method for reporting a power headroom report according to an embodiment of the present invention is described below with reference to FIG. 2. As shown in FIG. 2, the method includes the following steps:

Step 201: Trigger reporting of a first power headroom report, and determine that a condition of sending the first power headroom report is satisfied, where the condition of sending the first power headroom report includes: determining that uplink data channel transmission occurs in a current transmission time interval.

Reporting of the first power headroom report may be triggered in at least one of the following manners, triggering reporting of the first power headroom report when a power headroom report of a PUSCH of the carrier is triggered triggering reporting of the first power headroom report when radio resource control RRC signaling sent by a base station is received, where the RRC signaling may be an RRC connection reconfiguration request message, when default configuration of a user equipment is reporting the first power headroom report, triggering reporting of the first power headroom report according to the default configuration of the user equipment, triggering reporting of the first power headroom report when a configured periodic timer used to trigger reporting of the first power headroom report expires, triggering reporting of the first power headroom report when a configured report prohibit timer expires and a measured path loss change of the carrier exceeds a configured first threshold, where the report prohibit timer is used to prohibit reporting of the first power headroom report during a timing period of the report prohibit timer, triggering reporting of the first power headroom report when the data amount of at least one of a CQI (Channel Quality Indicator, channel quality indicator), ACK acknowledgment, and NACK negative acknowledgment that are currently sent on the PUCCH exceeds a configured second threshold, where specifically, statistics may be collected on the data amount of the CQI carried in PUCCH information currently sent on the PUCCH, and when the data amount of the carried CQI exceeds the configured second threshold, reporting of the first power headroom report is triggered; statistics may also be collected on the data amount of the ACK or the data amount of the NACK to trigger reporting of the first power headroom report according to the above method; statistics may further be collected on the data amount of at least one of the CQI, ACK, and NACK to trigger reporting of the first power headroom report according to the above method, triggering reporting of the first power headroom report when it is determined that a format for sending the first power headroom report is a set format, where specifically, reporting of the first power headroom report may be triggered when it is determined that the format of the first power headroom report is format 1; optionally, reporting of the first power headroom report may be triggered when it is determined that the format of the first power headroom report is format 1a, 1b, 2, 2a or 2b, or format 1, 1a, or 1b, triggering reporting of the first power headroom report when the number of one of ACKs, NACKs, and periodic CQIs that are currently sent on the PUCCH exceeds a configured third threshold, where specifically, statistics may be collected on the number of the periodic CQIs currently sent on the PUCCH, the number of the ACKs currently sent on the PUCCH, or the number of the NACKs currently sent on the PUCCH, or on the number of at least one of the ACKs, NACKs, and periodic CQIs, and reporting of the first power headroom report is triggered when a result of the statistics exceeds the configured third threshold, and triggering reporting of the first power headroom report when one of the number of carriers corresponding to an ACK currently sent on the PUCCH, the number of carriers corresponding to a NACK currently sent on the PUCCH, and the number of carriers corresponding to a periodic CQI currently sent on the PUCCH exceeds a configured fourth threshold, where specifically, statistics may be collected on the number of carriers corresponding to the periodic CQI currently sent on the PUCCH, the number of carriers corresponding to the ACK currently sent on the PUCCH, or the number of carriers corresponding to the NACK currently sent on the PUCCH, and reporting of the first power headroom report is triggered when a result of the statistics exceeds the configured fourth threshold.

The determining that the condition of sending the first power headroom report is satisfied further includes at least one of the following steps, determining that at least one first power headroom report has been triggered in the current transmission timer interval and determining to send the first power headroom report; and determining that control information is transmitted on the PUCCH in the current transmission time interval and determining to send the first power headroom report.

Optionally, when data is transmitted for the first time on a data channel and/or a control channel since the carrier is activated, configured, or reset, a trigger event is initialized, for example, a periodic trigger timer is started or restarted.

Step 202: Obtain the first power headroom report that needs to be reported, where the first power headroom report includes a first power headroom value, and the first power headroom value includes a difference between maximum transmitting power of a carrier and a sum of transmitting power of a control channel of the carrier and transmitting power of a data channel of the carrier. If no data is sent on the PUCCH currently, a sending format of the PUCCH of the carrier may be determined, and the transmitting power of the PUCCH is calculated according to the sending format. The transmitting power of the PUSCH is obtained. A difference between the maximum transmitting power of the carrier and a sum of the transmitting power of the PUCCH and a transmitting power of the PUSCH is used as a first power headroom difference, which is borne in the first power headroom report.

The first power headroom report that needs to be reported may also be obtained in the following manner. A physical layer directly calculates the first power headroom value, where the first power headroom value may be a difference between maximum transmitting power of a carrier and a sum of transmitting power of a physical uplink control channel PUCCH of the carrier and transmitting power of a physical uplink shared channel PUSCH of the carrier. A MAC (Medium Access layer, medium access layer) layer may directly obtain the first power headroom value from the physical layer and bear the first power headroom value in the first power headroom report.

Or, if the MAC layer pre-stores the first power headroom value, the pre-stored value may be obtained and used as the first power headroom value. The first power headroom value is borne in the first power headroom report.

Or, the MAC layer may obtain a PUSCH power headroom value and a PUCCH transmitting power value from the physical layer. The MAC layer subtracts the PUCCH transmitting power value from the PUSCH power headroom value to obtain the first power headroom value, and bears the first power headroom value in the first power headroom report.

Optionally, the obtained first power headroom value may be mapped, according to a mapping table of first power headroom values and first power headroom indexes, to a first power headroom index value that needs to be reported, where the first power headroom index value may be referred to as a power headroom level, and the first power headroom index value is borne in the first power headroom report.

If reporting of a power headroom report of the data channel of the carrier is also triggered while reporting of the first power headroom report is triggered, the MAC layer may obtain, from the physical layer, the first power headroom value and a power headroom value of the data channel of the carrier, where the first power headroom value includes the difference between the maximum transmitting power of the carrier and the sum of the transmitting power of the control channel of the carrier and the transmitting power of the data channel of the carrier.

Step 203: Send the first power headroom report.

In an implementation manner, before the sending the first power headroom report, the method further includes determining that reporting of a power headroom report of the data channel of the carrier is triggered, and determining, according to network configuration or rules set in a protocol, that the first power headroom report and the power headroom report of the data channel of the carrier are sent in the current transmission time interval, and that the size of a current uplink resource is capable of ensuring that the first power headroom report and the power headroom report of the data channel of the carrier are transmitted in the current transmission interval.

It should be noted that, the sequence of step 202 and the steps performed before the sending the first power headroom report is not strictly defined. Specifically, the first power headroom report that needs to be reported may be obtained before the step of determining, according to the network configuration or the rules set in the protocol, that the first power headroom report and the power headroom report of the data channel of the carrier are sent in the current transmission time interval, and that the size of the current uplink resource is capable of ensuring that the first power headroom report and the power headroom report of the data channel of the carrier are transmitted in the current transmission interval. Alternatively, the step of determining, according to the network configuration or the rules set in the protocol, that the first power headroom report and the power headroom report of the data channel of the carrier are sent in the current transmission time interval, and that the size of the current uplink resource is capable of ensuring that the first power headroom report and the power headroom report of the data channel of the carrier are transmitted in the current transmission interval may be performed before the step of obtaining the first power headroom report that needs to be reported.

Accordingly, the sending the first power headroom report includes instructing a multiplexing entity to send the first power headroom report and the power headroom report of the data channel of the carrier in the current transmission time interval, namely, TTI (Transmission Time Interval, transmission time interval), where specifically, the multiplexing entity may be instructed to use the same MAC CE (Medium Access layer control element, medium access layer control element) or different MAC CEs to send the first power headroom report and the power headroom report of the PUSCH of the carrier, and if it is determined that the first power headroom report and the power headroom report of the data channel of the carrier are sent in the current transmission interval and that the size of the current uplink resource does not allow that the first power headroom report and the power headroom report of the data channel of the carrier are transmitted in the current transmission interval, the process of sending the first power headroom report is stopped.

In another implementation manner, before the instructing the multiplexing entity to send the first power headroom report, the method may further include determining that reporting of a power headroom report of the data channel of the carrier is triggered, and determining, according to network configuration or rules set in a protocol, that the size of a current uplink resource does not allow that the first power headroom report and the power headroom report of the data channel of the carrier are sent in the current transmission time interval, and then determining the one with a higher sending priority of the first power headroom report and the power headroom report of the data channel of the carrier, where specifically, the sending priority of the first power headroom report may be higher than that of the power headroom report of the data channel of the carrier, or the sending priority of the power headroom report of the data channel of the carrier may be higher than that of the first power headroom report.

Accordingly, the sending the first power headroom report includes instructing the multiplexing entity to send the one with the higher sending priority of the first power headroom report and the power headroom report of the data channel of the carrier in the current transmission time interval, where the power headroom report with the higher sending priority may be the first power headroom report or the power headroom report of the data channel of the carrier, and if it is determined, according to the size of the current uplink resource, that the first power headroom report with the higher sending priority or the power headroom report of the PUSCH of the carrier with the higher sending priority cannot be sent in the current transmission time interval, the process of sending the first power headroom report is stopped.

It should be noted that, the sequence of step 202 and the steps performed before the sending the first power headroom report is not strictly defined. Specifically, the first power headroom report that needs to be reported may be obtained before the step of determining, according to the network configuration or the rules set in the protocol, that the size of the current uplink resource does not allow that the first power headroom report and the power headroom report of the data channel of the carrier are sent in the current transmission time interval and then determining the one with the higher sending priority of the first power headroom report and the power headroom report of the data channel of the carrier. Alternatively, the step of determining, according to the network configuration or the rules set in the protocol, that the size of the current uplink resource does not allow the first power headroom report and the power headroom report of the data channel of the carrier are sent in the current transmission time interval and then determining the one with the higher sending priority of the first power headroom report and the power headroom report of the data channel of the carrier may be performed before the step of obtaining the first power headroom report that needs to be reported.

Step 204: Optionally, if the first power headroom report is sent, initialize a condition of triggering the first power headroom report.

The initializing the condition of triggering the first power headroom report may include if the condition for triggering reporting of the first power headroom report is that the power headroom report of the PUSCH of the carrier is triggered, initializing a condition of triggering the power headroom report of the PUSCH.

The initializing the condition of triggering the first power headroom report may further be initializing a configured periodic timer used to trigger reporting of the first power headroom report, and/or initializing a configured report prohibit timer, where the report prohibit timer is used to prohibit reporting of the first power headroom report during a timing period of the report prohibit timer.

Step 205: Optionally, after the sending the first power headroom report, the method further includes canceling the first power headroom report that has been triggered.

Through a method for reporting a power headroom report according to the embodiment of the present invention, when data on the PUCCH and data on a PUSCH are sent in the same subframe at the same time, a base station can obtain a power headroom report considering transmitting power of a user equipment on a PUCCH, and the base station can obtain the power headroom report of the user equipment and perform resource scheduling correctly with reference to the power headroom report.

Figure 3:
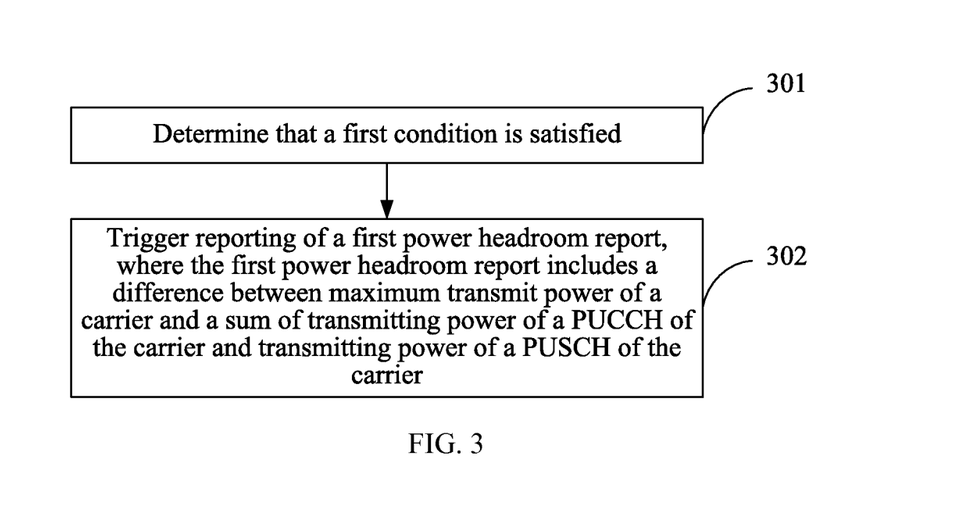
FIG. 3 is a flow chart of a method for triggering reporting of a power headroom report according to an embodiment of the present invention.

A method for triggering reporting of a power headroom report according to an embodiment of the present invention is described in detail below with reference to FIG. 3. As shown in FIG. 3, the method includes the following steps:

Step 301: Determine that a first condition is satisfied.

The first condition includes at least one of the following conditions, a power headroom report of a PUSCH of the carrier is triggered, a user equipment receives radio resource control RRC signaling sent by a base station, default configuration of the user equipment is reporting the first power headroom report, a configured periodic timer expires, a configured report prohibit timer expires and a measured path loss change of the carrier exceeds a configured first threshold, the data amount of at least one of a CQI, ACK, and NACK that are currently sent on the PUCCH exceeds a configured second threshold, where specifically, statistics may be collected on the data amount of the CQI carried in PUCCH information currently sent on the PUCCH, and when the data amount of the carried CQI exceeds the configured second threshold, reporting of the first power headroom report is triggered; statistics may also be collected on the data amount of the ACK or the data amount of the NACK to trigger reporting of the first power headroom report according to the above method; statistics may further be collected on the data amount of at least one of the CQI, ACK, and NACK to trigger reporting of the first power headroom report according to the above method, it is determined that a format for sending the first power headroom report is a set format, where specifically, reporting of the first power headroom report may be triggered when it is determined that the format of the first power headroom report is format 1; optionally, reporting of the first power headroom report may be triggered when it is determined that the format of the first power headroom report is format 1a, 1b, 2, 2a or 2b, or format 1, 1a, or 1b, the number of one of ACKs, NACKs, and periodic CQIs that are currently sent on the PUCCH exceeds a configured third threshold, where specifically, statistics may be collected on the number of the periodic CQIs currently sent on the PUCCH, the number of the ACKs currently sent on the PUCCH, or the number of the NACKs currently sent on the PUCCH, or on the number of at least one of the ACKs, NACKs, and periodic CQIs, and reporting of the first power headroom report is triggered when a result of the statistics exceeds the configured third threshold, and one of the number of carriers corresponding to an ACK currently sent on the PUCCH, the number of carriers corresponding to a NACK currently sent on the PUCCH, and the number of carriers corresponding to a periodic CQI currently sent on the PUCCH exceeds a configured fourth threshold, where specifically, statistics may be collected on the number of carriers corresponding to the periodic CQI currently sent on the PUCCH, the number of carriers corresponding to the ACK currently sent on the PUCCH, or the number of carriers corresponding to the NACK currently sent on the PUCCH, and when a result of the statistics exceeds the configured fourth threshold.

Step 302: Trigger reporting of a first power headroom report, where the first power headroom report includes a difference between maximum transmitting power of a carrier and a sum of transmitting power of a physical uplink control channel PUCCH of the carrier and transmitting power of a physical uplink shared channel PUSCH of the carrier.

In the method for triggering reporting of a power headroom report according to the embodiment of the present invention, through a first power headroom report considering transmitting power on a PUCCH, the method for a user equipment to send the first power headroom report is improved. Multiple methods for triggering the first power headroom report are provided, improving diversity and adaptability.

Figure 4:
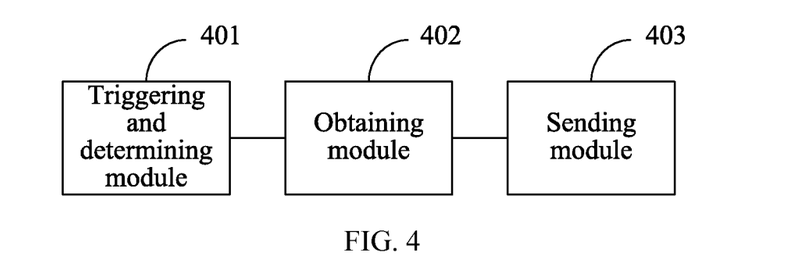
FIG. 4 is a schematic structural diagram of a user equipment according to an embodiment of the present invention.

A user equipment according to an embodiment of the present invention is described in detail below with reference to FIG. 4. As shown in FIG. 4, the user equipment includes a triggering and determining module 401, configured to trigger reporting of a first power headroom report, and determine that a condition of sending the first power headroom report is satisfied, where the condition of sending the first power headroom report includes: determining that uplink data channel transmission occurs in a current transmission time interval, an obtaining module 402, configured to be triggered to obtain the first power headroom report when the triggering and determining module 401 triggers reporting of the first power headroom report and determines that the condition of sending the first power headroom report is satisfied, where the first power headroom report includes a first power headroom value, and the first power headroom value includes a difference between maximum transmitting power of a carrier and a sum of transmitting power of a control channel of the carrier and transmitting power of a data channel of the carrier, and a sending module 403, configured to send the first power headroom report obtained by the obtaining module 402.

Through a method for reporting a power headroom report according to the embodiment of the present invention, when data on the PUCCH and data on a PUSCH are sent in the same subframe at the same time, a base station can obtain a power headroom report considering transmitting power of a user equipment on a PUCCH, and the base station can obtain the power headroom report of the user equipment and perform resource scheduling correctly with reference to the power headroom report.

Figure 5A:
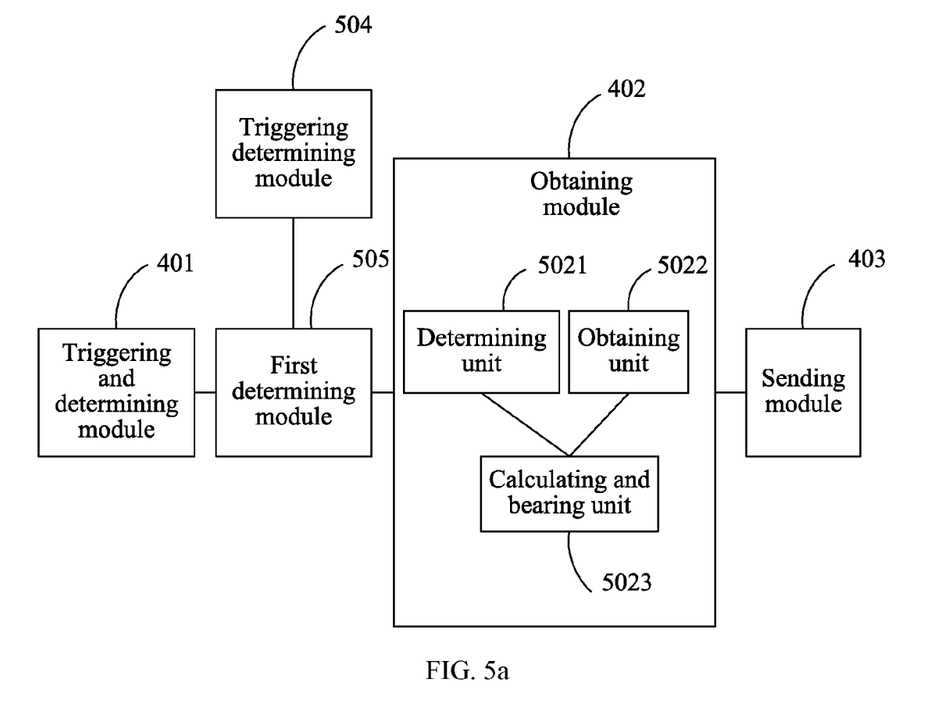
FIG. 5a is a schematic structural diagram of another user equipment according to an embodiment of the present invention.

Another user equipment according to an embodiment of the present invention is described in detail below with reference to FIG. 5*a*. As shown in FIG. 5*a*, the user equipment includes the triggering and determining module 401, the obtaining module 402 and the sending module 403 in the embodiment shown in FIG. 4, and the triggering and determining module 401 includes at least one of the following units. A first unit, configured to trigger reporting of the first power headroom report when a power headroom report of the data channel of the carrier is triggered. A second unit, configured to trigger reporting of the first power headroom report when radio resource control RRC signaling sent by a base station is received, where the RRC signaling may be an RRC connection reconfiguration request message. A third unit, configured to: when default configuration of the user equipment is reporting the first power headroom report, trigger reporting of the first power headroom report according to the default configuration of the user equipment. A fourth unit, configured to trigger reporting of the first power headroom report when a configured periodic timer used to trigger reporting of the first power headroom report expires. A fifth unit, configured to trigger reporting of the first power headroom report when a configured report prohibit timer expires and a measured path loss change of the carrier exceeds a configured first threshold, where the report prohibit timer is used to prohibit reporting of the first power headroom report during a timing period of the report prohibit timer. A sixth unit, configured to trigger reporting of the first power headroom report when the data amount of at least one of a CQI, ACK, and NACK that are currently sent on the control channel exceeds a configured second threshold, where specifically, statistics may be collected on the data amount of the CQI carried in PUCCH information currently sent on the PUCCH, and when the data amount of the carried CQI exceeds the configured second threshold, reporting of the first power headroom report is triggered; statistics may also be collected on the data amount of the ACK or the data amount of the NACK to trigger reporting of the first power headroom report according to the above method; statistics may further be collected on the data amount of at least one of the CQI, ACK, and NACK to trigger reporting of the first power headroom report according to the above method. A seventh unit, configured to trigger reporting of the first power headroom report when it is determined that a format for sending the first power headroom report is a set format, where specifically, reporting of the first power headroom report may be triggered when it is determined that the format of the first power headroom report is format 1; optionally, reporting of the first power headroom report may be triggered when it is determined that the format of the first power headroom report is format 1a, 1b, 2, 2a or 2b, or format 1, 1a, or 1b. An eighth unit, configured to trigger reporting of the first power headroom report when the number of one of ACKs, NACKs, and periodic CQIs that are currently sent on the control channel exceeds a configured third threshold, where specifically, statistics may be collected on the number of the periodic CQIs currently sent on the PUCCH, the number of the ACKs currently sent on the PUCCH, or the number of the NACKs currently sent on the PUCCH, or on the number of at least one of the ACKs, NACKs, and periodic CQIs, and reporting of the first power headroom report is triggered when a result of the statistics exceeds the configured third threshold. And a ninth unit, configured to trigger reporting of the first power headroom report when one of the number of carriers corresponding to an ACK currently sent on the control channel, the number carriers corresponding to a NACK currently sent on the control channel, and the number of carriers corresponding to a periodic CQI currently sent on the control channel exceeds a configured fourth threshold, where specifically, statistics may be collected on the number of carriers corresponding to the periodic CQI currently sent on the PUCCH, the number of carriers corresponding to the ACK currently sent on the PUCCH, or the number of carriers corresponding to the NACK currently sent on the PUCCH, and reporting of the first power headroom report is triggered when a result of the statistics exceeds the configured fourth threshold.

The triggering and determining module 401 is further configured to determine that the condition of sending the first power headroom report is satisfied, where the condition of sending the first power headroom report further includes at least one of the following conditions. It is determined that at least one first power headroom report has been triggered in the current transmission time interval, and it is determined that control information is transmitted on the control channel in the current transmission time interval.

The obtaining module 402 may include a determination unit 5021, configured to determine a sending format of the control channel of the carrier, and calculate the transmitting power of the control channel according to the sending format, an obtaining unit 5022, configured to obtain the transmitting power of the data channel, and a calculation and bearing unit 5023, configured to use the difference between the maximum transmitting power of the carrier and the sum of the transmitting power of the control channel and the transmitting power of the data channel, as the first power headroom value, and bear the first power headroom value in the first power headroom report.

Optionally, the obtained first power headroom value may be mapped, according to a mapping table of first power headroom values and first power headroom indexes, to a first power headroom index value that needs to be reported, where the first power headroom index value may be referred to as a power headroom level, and the first power headroom index value is borne in the first power headroom report.

In an embodiment, on the basis of the triggering and determining module 401, the obtaining module 402, and the sending module 403, the user equipment may further include a trigger determining module 504, configured to determine that reporting of a power headroom report of the data channel of the carrier is triggered, and a first determinating module 505, configured to determine that the first power headroom report triggered by the triggering and determining module 401 and the power headroom report of the data channel of the carrier triggered by the trigger determining module 504 are sent in the current transmission time interval, and that the size of a current uplink resource is capable of ensuring the first power headroom report and the power headroom report of the data channel of the carrier are transmitted in the current transmission time interval.

Accordingly, the obtaining module 402 is further configured to obtain the power headroom report of the data channel of the carrier, and the sending module 403 is specifically configured to instruct a multiplexing entity to send, in the current transmission time interval, the first power headroom report and the power headroom report of the data channel of the carrier that are obtained by the obtaining module 402, where the multiplexing entity may be instructed to use the same MAC CE (Medium Access layer control element, medium access layer control element) or different MAC CEs to send the first power headroom report and the power headroom report of the PUSCH of the carrier, and if it is determined that the first power headroom report the power headroom report of the data channel of the carrier are sent in the current transmission interval and that the size of the current uplink resource does not allow that the first power headroom report and the power headroom report of the data channel of the carrier are transmitted in the current transmission interval, the process of sending the first power headroom report is stopped.

Figure 5B:
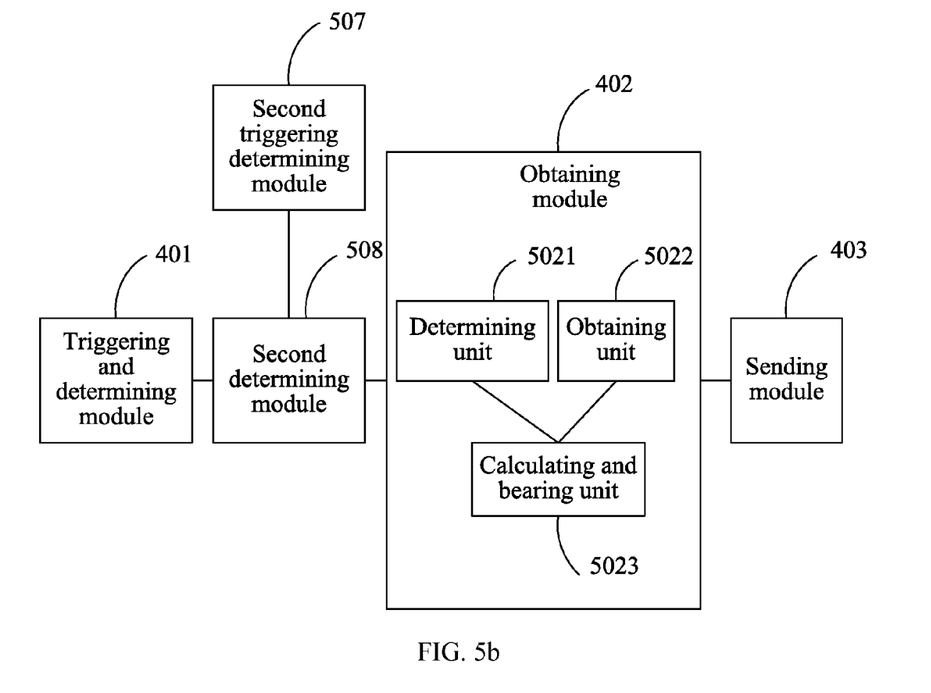
FIG. 5b is a schematic structural diagram of still another user equipment according to an embodiment of the present invention.

In an embodiment, as shown in FIG. 5b, on the basis of the triggering and determining module 401, the obtaining module 402, and the sending module 403, the user equipment may further include a second triggering determining module 507, configured to determine that reporting of a power headroom report of the data channel of the carrier is triggered, and a second determining module 508, configured to determine that the size of a current uplink resource does not allow that the first power headroom report triggered by the triggering and determining module 401 and the power headroom report of the data channel of the carrier triggered by the second triggering determining module 507 are sent in the current transmission time interval, and determine the one with a higher sending priority of the first power headroom report and the power headroom report of the data channel of the carrier.

Accordingly, the obtaining module 402 is further configured to obtain the one with the higher sending priority of the first power headroom report and the power headroom report of the data channel of the carrier.

When the first power headroom report has the higher sending priority, the obtaining module 402 may include a determination unit 5021, configured to determine a sending format of the control channel of the carrier, and calculate the transmitting power of the control channel according to the sending format, an obtaining unit 5022, configured to obtain the transmitting power of the data channel, and a calculation and bearing unit 5023, configured to use the difference between the maximum transmitting power of the carrier and the sum of the transmitting power of the control channel and the transmitting power of the data channel, as the first power headroom value, and bear the first power headroom value in the first power headroom report.

Optionally, the obtained first power headroom value may be mapped, according to a mapping table of first power headroom values and first power headroom indexes, to a first power headroom index value that needs to be reported, where the first power headroom index value may be referred to as a power headroom level, and the first power headroom index value is borne in the first power headroom report.

The sending module 403 is specifically configured to instruct a multiplexing entity to send, in the current transmission time interval, the one, obtained by the obtaining module 402, with the higher sending priority of the first power headroom report and the power headroom report of the data channel of the carrier, where the power headroom report with the higher sending priority may be the first power headroom report or the power headroom report of the data channel of the carrier, and if it is determined, according to the size of the current uplink resource, that the first power headroom report with the higher sending priority or the power headroom report of the PUSCH of the carrier with the higher sending priority cannot be sent in the current transmission time interval, the process of sending the first power headroom report is stopped.

Through a user equipment and another user equipment according to the embodiments of the present invention, when data on the PUCCH and data on a PUSCH are sent in the same subframe at the same time, a base station can obtain a power headroom report considering transmitting power of a user equipment on a PUCCH, and the base station can obtain the power headroom report of the user equipment and perform resource scheduling correctly with reference to the power headroom report.

Figure 6:
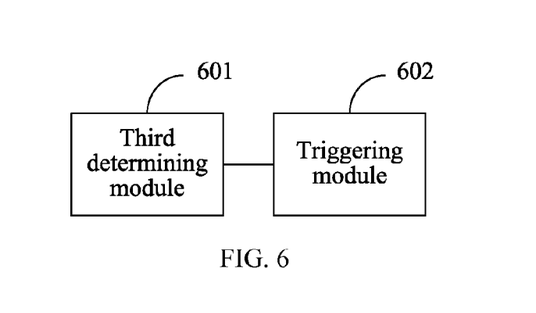
FIG. 6 is a schematic structural diagram of yet another user equipment according to an embodiment of the present invention.

Yet another user equipment according to an embodiment of the present invention is described in detail below with reference to FIG. 6. As shown in FIG. 6, the user equipment includes, a third determining module 601, configured to determine that a first condition is satisfied, and a triggering module 602, configured to trigger reporting of a first power headroom report when the third determining module determines that the first condition is satisfied, where the first power headroom report includes a difference between maximum transmitting power of a carrier and a sum of transmitting power of a control channel of the carrier and transmitting power of a data channel of the carrier.

The first condition includes at least one of the following conditions a power headroom report of the data channel of the carrier is triggered, radio resource control RRC signaling sent by a base station is received, where the RRC signaling may be an RRC connection reconfiguration request message, default configuration of the user equipment is reporting the first power headroom report, a configured periodic timer used to trigger reporting of the first power headroom report expires, a configured report prohibit timer expires and a measured path loss change of the carrier exceeds a configured first threshold, where the report prohibit timer is used to prohibit reporting of the first power headroom report during a timing period of the report prohibit timer, the data amount of at least one of a CQI, ACK, and NACK that are currently sent on the control channel exceeds a configured second threshold, where specifically, statistics may be collected on the data amount of the CQI carried in PUCCH information currently sent on the PUCCH, and when the data amount of the carried CQI exceeds the configured second threshold, reporting of the first power headroom report is triggered; statistics may also be collected on the data amount of the ACK or the data amount of the NACK to trigger reporting of the first power headroom report according to the above method; statistics may further be collected on the data amount of at least one of the CQI, ACK, and NACK to trigger reporting of the first power headroom report according to the above method, it is determined that a format for sending the first power headroom report is a set format, where specifically, reporting of the first power headroom report may be triggered when it is determined that the format of the first power headroom report is format 1; optionally, reporting of the first power headroom report may be triggered when it is determined that the format of the first power headroom report is format 1a, 1b, 2, 2a or 2b, or format 1, 1a, or 1b, the number of one of ACKs, NACKs, and periodic CQIs that are currently sent on the control channel exceeds a configured third threshold, where specifically, statistics may be collected on the number of the periodic CQIs currently sent on the PUCCH, the number of the ACKs currently sent on the PUCCH, or the number of the NACKs currently sent on the PUCCH, or on the number of at least one of the ACKs, NACKs, and periodic CQIs, and reporting of the first power headroom report is triggered when a result of the statistics exceeds the configured third threshold, and one of the number of carriers corresponding to an ACK currently sent on the control channel, the number of carriers corresponding to a NACK currently sent on the control channel, and the number of carriers corresponding to a periodic CQI currently sent on the control channel exceeds a configured fourth threshold, where specifically, statistics may be collected on the number of carriers corresponding to the periodic CQI currently sent on the PUCCH, the number of carriers corresponding to the ACK currently sent on the PUCCH, or the number of carriers corresponding to the NACK currently sent on the PUCCH, and reporting of the first power headroom report is triggered when a result of the statistics exceeds the configured fourth threshold.

In still another user equipment according to the embodiment of the present invention, through a first power headroom report considering transmitting power on a PUCCH, the method for the user equipment to send the first power headroom report is improved. Multiple methods for triggering the first power headroom report are provided, improving diversity and adaptability.

Persons skilled in the art should understand that the modules of the apparatus in the embodiments of the present invention are divided by functions and that in practice, the function modules may be separated or combined for the specific structure.

In the preceding embodiments of the present invention, the wording "receive" may be construed as actively obtaining information from other units or receiving information sent by other units.

The sequence numbers of the preceding embodiments of the present invention are merely for description purpose but do not indicate the preference of the embodiments.

The technical solutions disclosed in the claims also fall within the protection scope of the embodiments of the present invention.

Persons skilled in the art should understand that all or part of the steps of the preceding methods in the embodiments may be implemented by hardware following instructions of programs. The programs may be stored in a computer readable storage medium.

The above are merely provided as exemplary embodiments of the present invention, but are not intended to limit the protection scope of the present invention. Any modification, equivalent replacement, or improvement made within the spirit and principle of the present invention shall fall within the protection scope of the present invention.

What is claimed is:

1. A method for reporting a power headroom report, the method comprising:
   triggering reporting of a first power headroom report;
   determining that a condition of transmitting the first power headroom report is satisfied, wherein the condition of transmitting the first power headroom report comprises a determination that uplink data channel transmission occurs in a current transmission time interval;
   obtaining the first power headroom report and a second power headroom report, wherein the first power headroom report comprises a first power headroom value that comprises a difference between maximum transmitting power of a carrier and a sum of transmitting power of a control channel of the carrier and transmitting power of a data channel of the carrier, and the second power headroom report comprises a second power headroom value that comprises a difference between the maximum transmitting power of the carrier and the transmitting power of the data channel of the carrier;
   instructing a multiplexing entity to use the same Medium Access layer control element (MAC CE) to transmit the first power headroom report and the second power headroom report of the carrier in the current transmission time interval; and transmitting the first power headroom report and the second power headroom report of the carrier in the current transmission time interval using the same MAC CE.

2. The method according to claim 1, wherein the triggering reporting of the first power headroom report comprises at least one of the following steps:

triggering reporting of the first power headroom report when a power headroom report of the data channel of the carrier is triggered;

triggering reporting of the first power headroom report when radio resource control RRC signaling sent by a base station is received;

when default configuration of a user equipment is reporting the first power headroom report, triggering reporting of the first power headroom report according to the default configuration of the user equipment;

triggering reporting of the first power headroom report when a configured periodic timer used to trigger reporting of the first power headroom report expires;

triggering reporting of the first power headroom report when a configured report prohibit timer expires and a measured path loss change of the carrier exceeds a configured first threshold, wherein the report prohibit timer is used to prohibit reporting of the first power headroom report during a timing period of the report prohibit timer;

triggering reporting of the first power headroom report when the data amount of at least one of a channel quality indicator CQI, an acknowledgment ACK, and a negative acknowledgment NACK that are currently sent on the control channel exceeds a configured second threshold;

triggering reporting of the first power headroom report when it is determined that a format for sending the first power headroom report is a set format;

triggering reporting of the first power headroom report when the number of ACKs, NACKs, or periodic CQIs currently sent on the control channel exceeds a configured third threshold; and triggering reporting of the first power headroom report when one of the number of carriers corresponding to an ACK currently sent on the control channel, the number of carriers corresponding to a NACK currently sent on the control channel, and the number of carriers corresponding to a periodic CQI currently sent on the control channel exceeds a configured fourth threshold.

3. The method according to claim 1, wherein the condition of transmitting the first power headroom report further comprises at least one of the following conditions:

determining that at least one first power headroom report is triggered in the current transmission time interval; and determining that control information is transmitted on the control channel in the current transmission time interval.

4. The method according to claim 1, wherein the obtaining the first power headroom report comprises:

determining a sending format of the control channel of the carrier:

calculating the transmitting power of the control channel according to the sending format;

obtaining the transmitting power of the data channel; and using the difference between the maximum transmitting power of the carrier and the sum of the transmitting power of the control channel and the transmitting power of the data channel as the first power headroom value, and bearing the first power headroom value in the first power headroom report.

5. The method according to claim 1, wherein, before transmitting the first power headroom report, the method further comprises:

determining that reporting of the second power headroom report of the carrier is triggered; and determining that the first power headroom report and the second power headroom report of the carrier are transmitted in the current transmission time interval, and that the size of a current uplink resource is capable of ensuring that the first power headroom report and the second power headroom report of the carrier are transmitted in a current transmission time interval.

6. The method according to claim 1, wherein, after transmitting the first power headroom report, the method further comprises canceling the first power headroom report that has been triggered.

7. An apparatus for reporting a power headroom report, wherein the apparatus comprises a processor and a transmitter and wherein:

the processor is configured to trigger reporting of a first power headroom report and to determine that a condition of transmitting the first power headroom report is satisfied, wherein the condition of transmitting the first power headroom report comprises a determination that uplink data channel transmission occurs in a current transmission time interval;

the processor is configured to obtain the first power headroom report and a second power headroom report when the reporting of the first power headroom report is triggered and it is determined that the condition of transmitting the first power headroom report is satisfied, wherein the first power headroom report comprises a first power headroom value that comprises a difference between maximum transmitting power of a carrier and a sum of transmitting power of a control channel of the carrier and transmitting power of a data channel of the carrier, and the second power headroom report comprises a second power headroom value that comprises a difference between the maximum transmitting power of the carrier and the transmitting power of the data channel of the carrier;

the processor is configured to instruct a multiplexing entity to use the same Medium Access layer control element (MAC CE) to transmit the first power headroom report and the second power headroom report of the carrier in the current transmission time interval; and the transmitter is configured to transmit the first power headroom report and the second power headroom report of the carrier in the current transmission time interval by the same MAC CE.

8. The apparatus according to claim 7, wherein the processor is configured to trigger reporting of the first power headroom report when a power headroom report of the data channel of the carrier is triggered.

9. The apparatus according to claim 7, wherein the condition of transmitting the first power headroom report further comprises a determination that at least one first power headroom report has been triggered in the current transmission time interval.

10. The apparatus according to claim 7, wherein the processor is configured to:

determine a sending format of the control channel of the carrier and to calculate the transmitting power of the control channel according to the sending format, obtain the transmitting power of the data channel, and use the difference between the maximum transmitting power of the carrier and the sum of the transmitting power of the control channel and the transmitting power of the data channel as the first power headroom value, and to bear the first power headroom value in the first power headroom report.

11. The apparatus according to claim 7, wherein the processor is configured to cancel the first power headroom report that has been triggered, after the transmitter transmits the first power headroom report.

12. The apparatus according to claim 7, wherein the processor is configured to trigger reporting of the first power headroom report when radio resource control RRC signaling sent by a base station is received.

13. The apparatus according to claim 7, wherein the processor is configured to trigger reporting of the first power headroom report according to the default configuration of the user equipment when default configuration of the user equipment is reporting the first power headroom report.

14. The apparatus according to claim 7, wherein the processor is configured to trigger reporting of the first power headroom report when a configured periodic timer used to trigger reporting of the first power headroom report expires.

15. The apparatus according to claim 7, wherein the processor is configured to trigger reporting of the first power headroom report when a configured report prohibit timer expires and a measured path loss change of the carrier exceeds a configured first threshold, wherein the report prohibit timer is used to prohibit reporting of the first power headroom report during a timing period of the report prohibit timer.

16. The apparatus according to claim 7, wherein the processor is configured to trigger reporting of the first power headroom report when the data amount of at least one of a channel quality indicator CQI, an acknowledgment ACK, and a negative acknowledgment NACK that are currently sent on the control channel exceeds a configured second threshold.

17. The apparatus according to claim 7, wherein the processor is configured to trigger reporting of the first power headroom report when it is determined that a format for sending the first power headroom report is a set format.

18. The apparatus according to claim 7, wherein the processor is configured to trigger reporting of the first power headroom report when the number of one of ACKs, NACKs, and periodic CQIs that are currently sent on the control channel exceeds a configured third threshold.

19. The apparatus according to claim 7, wherein the processor is configured to trigger reporting of the first power headroom report when one of the number of carriers corresponding to an ACK currently sent on the control channel, the number of carriers corresponding to a NACK currently sent on the control channel, and the number of carriers corresponding to a periodic CQI currently sent on the control channel exceeds a configured fourth threshold.

20. The apparatus according to claim 7, wherein the condition of transmitting the first power headroom report further comprises a determination that control information is transmitted on the control channel in the current transmission time interval.

* * * * *